United States Patent [19]

Grosch

[11] 4,020,541

[45] May 3, 1977

[54] HEAD SHAFT BREAKING TOOL

[76] Inventor: Gottlieb W. Grosch, Silver Creek, Nebr. 68663

[22] Filed: Apr. 21, 1976

[21] Appl. No.: 679,026

[52] U.S. Cl. .................................. 29/283; 269/101
[51] Int. Cl.[2] .......................................... B23Q 1/00
[58] Field of Search ............ 29/283; 81/71, 180 R, 81/177 D; 269/101

[56] References Cited

UNITED STATES PATENTS

| | | | |
|---|---|---|---|
| 1,785,847 | 12/1930 | Valentine | 81/71 |
| 2,408,450 | 10/1946 | Schrader | 81/71 |

*Primary Examiner*—James L. Jones, Jr.
*Attorney, Agent, or Firm*—Zarley, McKee, Thomte & Voorhees

[57] ABSTRACT

A head shaft breaking tool comprising an elongated hollow shank portion adapted to be slipped over the head shaft. The lower end of the shank portion is provided with a plurality of spaced-apart teeth which are adapted to engage the coupling at the lower end of the head shaft. A cross bar is secured to the shank portion at the upper end thereof and is adapted to receive hold-down bolts extending upwardly from a housing at the upper end of the head shaft to draw the teeth into engagement with the coupling and to prevent rotation of the shank portion as the head shaft is rotated relative to the coupling by means of a pipe wrench or the like.

1 Claim, 6 Drawing Figures

HEAD SHAFT BREAKING TOOL

BACKGROUND OF THE INVENTION

It is frequently necessary to remove the head shafts from a pump assembly for one reason or another. Heretofore, it was necessary that the pump housing first be removed with the entire assembly then being vertically moved upwardly by means of a boom truck or the like to gain access to the coupling at the lower end of the head shaft. This procedure was extremely costly and time consuming.

Therefore, it is a principal object of the invention to provide a head shaft breaking tool.

A further object of the invention is to provide an improved tool for use in removing a head shaft.

A still further object of the invention is to provide a head shaft breaking tool including means for preventing rotation of the coupling at the lower end of the head shaft.

A still further object of the invention is to provide a head shaft breaking tool which accomodates housings of varying sizes.

A still further object of the invention is to provide a head shaft breaking tool which is economical to manufacture and durable in use.

DESCRIPTION OF THE PREFERRED EMBODIMENT

Figure 1:
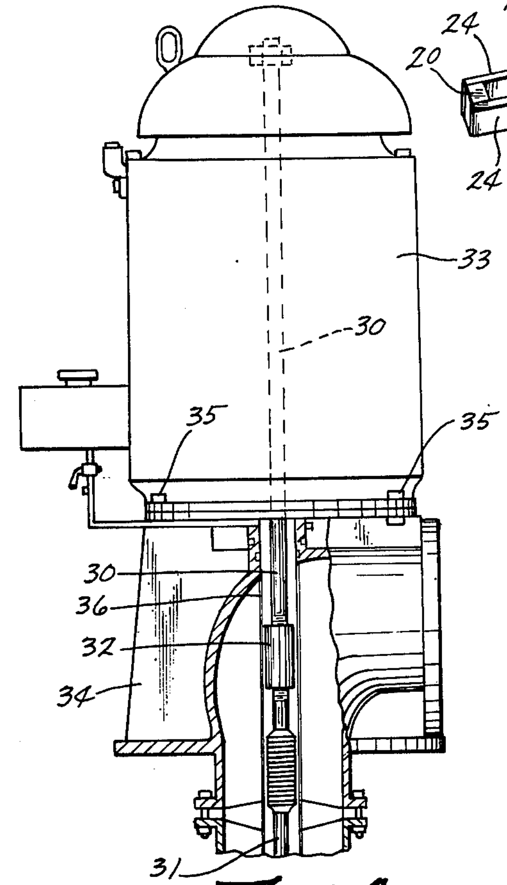
FIG. 1 is a partial side view of a pump housing with portions thereof cut away.
Figure 2:
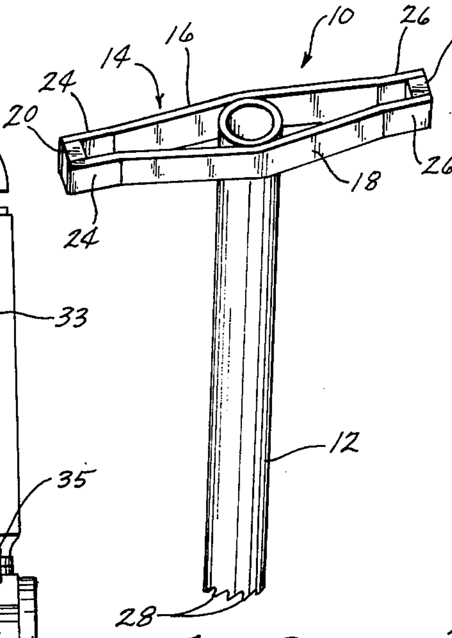
FIG. 2 is a perspective view of the tool of this invention.
Figure 3:
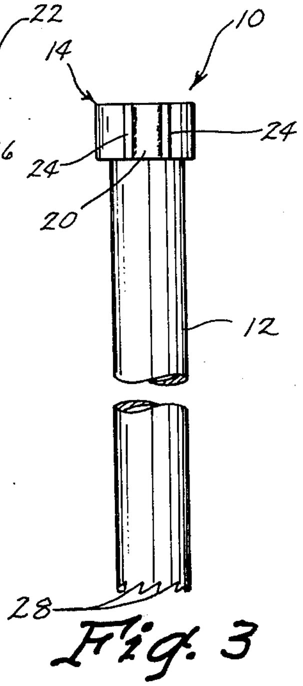
FIG. 3 is a partial side view of the tool.
Figure 4:
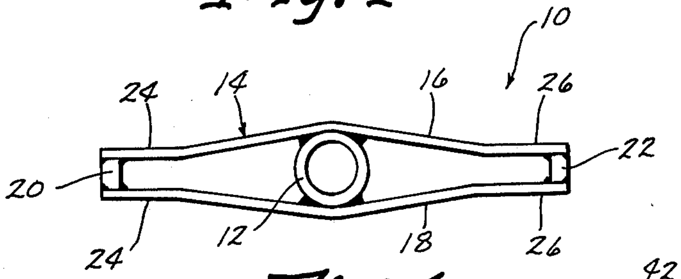
FIG. 4 is a top view of the tool.
Figure 5:
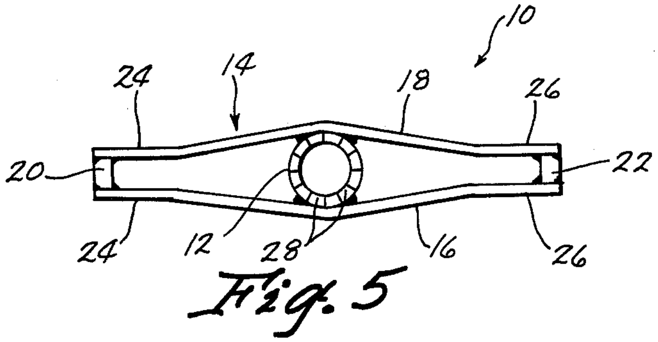
FIG. 5 is a bottom view of the tool.

The wrench or tool of this invention is referred to generally by the reference numeral 10 and comprises an elongated hollow shank or pipe portion 12 having a cross-arm means 14 at one end thereof. Cross-arm means 14 comprises cross-arm members 16 and 18 secured to opposite sides of shank portion 12 by welding or the like and extending outwardly therefrom. The ends of members 16 and 18 are secured together by means of spacers 20 and 22 welded thereto respectively. Members 16 and 18 include generally parallel and spaced-apart portions 24 and 26 at the opposite ends thereof for a purpose to be described in more detail hereinafter. As seen in the drawings, shank portion 12 is provided with a plurality of spaced-apart and projecting teeth 28 at the lower end thereof.

Tool 10 is designed to "break" a head shaft 30 from coupling 32 at the lower end thereof. Head shaft 30 is normally secured to the lower shaft portions 31 by the coupling 32. Head shaft 30 normally extends downwardly from housing 34 which would normally be provided at the lower end of pump 33. Head shaft 30 normally extends downwardly from the pump through the oil tube 36 as illustrated in FIG. 1.

Figure 6:
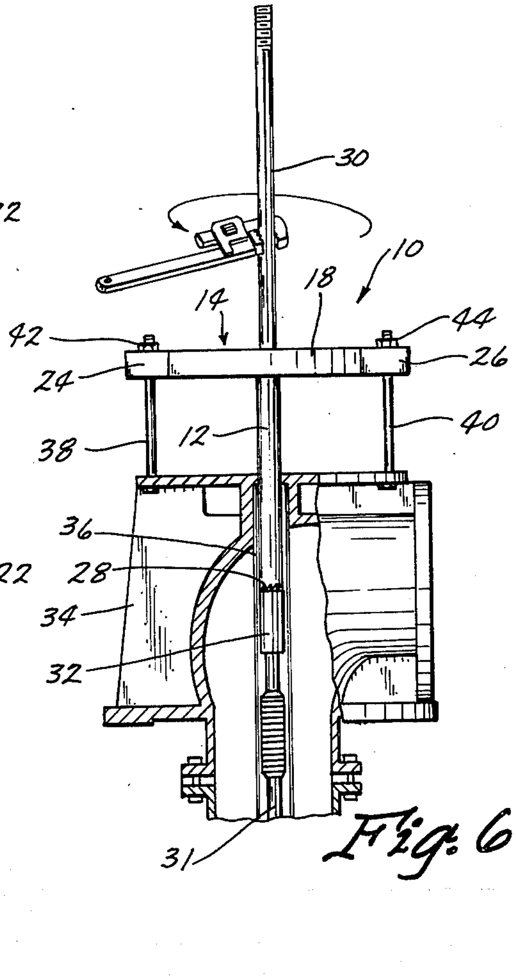
FIG. 6 is a partial sectional view illustrating the tool being used to loosen a head shaft.

When it is necessary to remove the head shaft 30 from the lower shaft portions, the pump 33 is first removed from the housing 34 by removing bolts 35. With the pump so removed, the upper end of head shaft 30 will be exposed above housing 34 as seen in FIG. 6.

Shank portion 12 of tool 10 is slipped over the upper end of head shaft 30 and moved downwardly with respect thereto until teeth 28 engage the upper end of coupling 32. This is possible due to the fact that coupling 32 has a larger diameter than shaft 30 and shank portion 12.

Hold-down bolts 38 and 40 are then extended through the openings, which previously received bolts 35, in housing 34 as illustrated in the drawings. Bolts 38 and 40 are extended upwardly between parallel portions 24 and 26 respectively. Nuts 42 and 44 are then threadably mounted on the upper ends of bolts 38 and 40 above cross-arm means 14 and are tightened to "draw" tool 10 downwardly relative to head shaft 30 and housing 34 so that teeth 28 are forced into coupling 32. Nuts 42 and 44 have larger diameters than the spacing between members 16 and 18 at parallel portions 24 and 26. A pipe wrench or the like is then attached to the exposed upper end of head shaft 30 as seen in FIG. 6 to rotate the head shaft 30 relative to tool 10 and housing 34. The engagement of the teeth 28 with coupling 32 and the connection of the tool 10 to the housing 34 by bolts 38 and 40 prevents rotation of coupling 32 as head shaft 30 is threadably loosened by means of the pipe wrench. Thus, head shaft 30 may be threadably removed from coupling 32 without the entire pipe string assembly being required to be lifted as was necessary heretofore.

The spaced-apart parallel portions 24 and 26 permit the bolts 38 and 40 to be adjustably received therebetween. In other words, larger housings 34 would necessitate the bolts 38 and 40 being received between portions 24 and 26 adjacent the outer ends thereof. When smaller housings 34 are encountered, the bolts 38 and 40 will be received by the portions 24 and 26 closer to shank portion 12. Thus, tool 10 may be secured to housings having varying sizes.

Once the head shaft 30 is removed, the bolts 38 and 40 may be removed to permit the tool 10 to also be removed. Thus it can be seen that a novel head shaft breaking tool has been provided which is not only easy to use but which may be used in various size installations. It can also be seen that the hollow shank portion of the wrench permits the tool to accomodate head shafts having varying lengths. The teeth 28 at the lower end of the shank portion insure that the tool will be drawn into positive engagement with the coupling 32 to prevent rotation of the coupling as the head shaft is threadably removed therefrom.

Thus it can be seen that the tool of this invention accomplishes at least all of its stated objectives.

I claim:

1. A tool for removing a vertically disposed head shaft extending upwardly from a housing means, said housing means having a pair of horizontally spaced-apart and vertically disposed openings formed therein, said shaft having a coupling means threadably mounted at its lower end which is threadably connected to a shaft portion extending downwardly therefrom, comprising, an elongated hollow shank portion having upper and lower ends and having a diameter sufficient to permit said shank portion to receive said head shaft so that said head shaft extends upwardly therefrom, the lower end of said shank portion having a plurality of teeth projecting therefrom for engagement with the coupling means when said shank portion receives said head shaft, a cross-arm means adjacent the upper end of said shank portion and including means for receiving hold-down bolts extending upwardly from the openings in said pump housing so that said shank portion will prevent the rotation of said coupling means when said head shaft is rotated relative to said shank portion to remove said head shaft from said coupling means.

* * * * *